United States Patent [19]

Wactor

[11] Patent Number: 5,450,280

[45] Date of Patent: Sep. 12, 1995

[54] VOLTAGE TRANSFORMER DISCONNECT GROUNDING SYSTEM

[75] Inventor: Michael W. Wactor, Houston, Tex.

[73] Assignee: Powell Electrical Manufacturing Company, Houston, Tex.

[21] Appl. No.: 183,123

[22] Filed: Jan. 18, 1994

[51] Int. Cl.⁶ .............................................. H02B 11/00
[52] U.S. Cl. ................................ 361/606; 200/50 A; 361/620; 361/623; 174/51
[58] Field of Search ............ 174/51; 200/50 R, 50 A, 200/50 AA; 361/606–617, 620, 623, 626, 835–837

[56] References Cited

U.S. PATENT DOCUMENTS

| | | | |
|---|---|---|---|
| 2,689,293 | 9/1954 | Claybourn et al. | 361/606 |
| 2,795,739 | 6/1957 | Wood | 361/609 |
| 2,879,347 | 3/1959 | Diederich | 200/50 A |
| 4,090,230 | 5/1978 | Fuller et al. | 361/623 |

Primary Examiner—Gregory D. Thompson
Attorney, Agent, or Firm—Winstead Sechrest & Minick

[57] ABSTRACT

A device grounding system is shown which ensures that upon disconnect, an operator will be able to visually determine that a ground has been applied to the disconnected device. The grounding system is designed to mechanically drive a linkage which is controlled by the position of pullout chassis such that when the power bus is connected to the device, the ground is removed in a fail safe manner. As the chassis is opened, a gap distance is achieved between the device and the power source after which a ground rod is driven against input contacts on the disconnected device. The ground rod remains against the contacts through the full movement of the withdrawn chassis to ensure against inadvertent contacts with live devices.

10 Claims, 6 Drawing Sheets

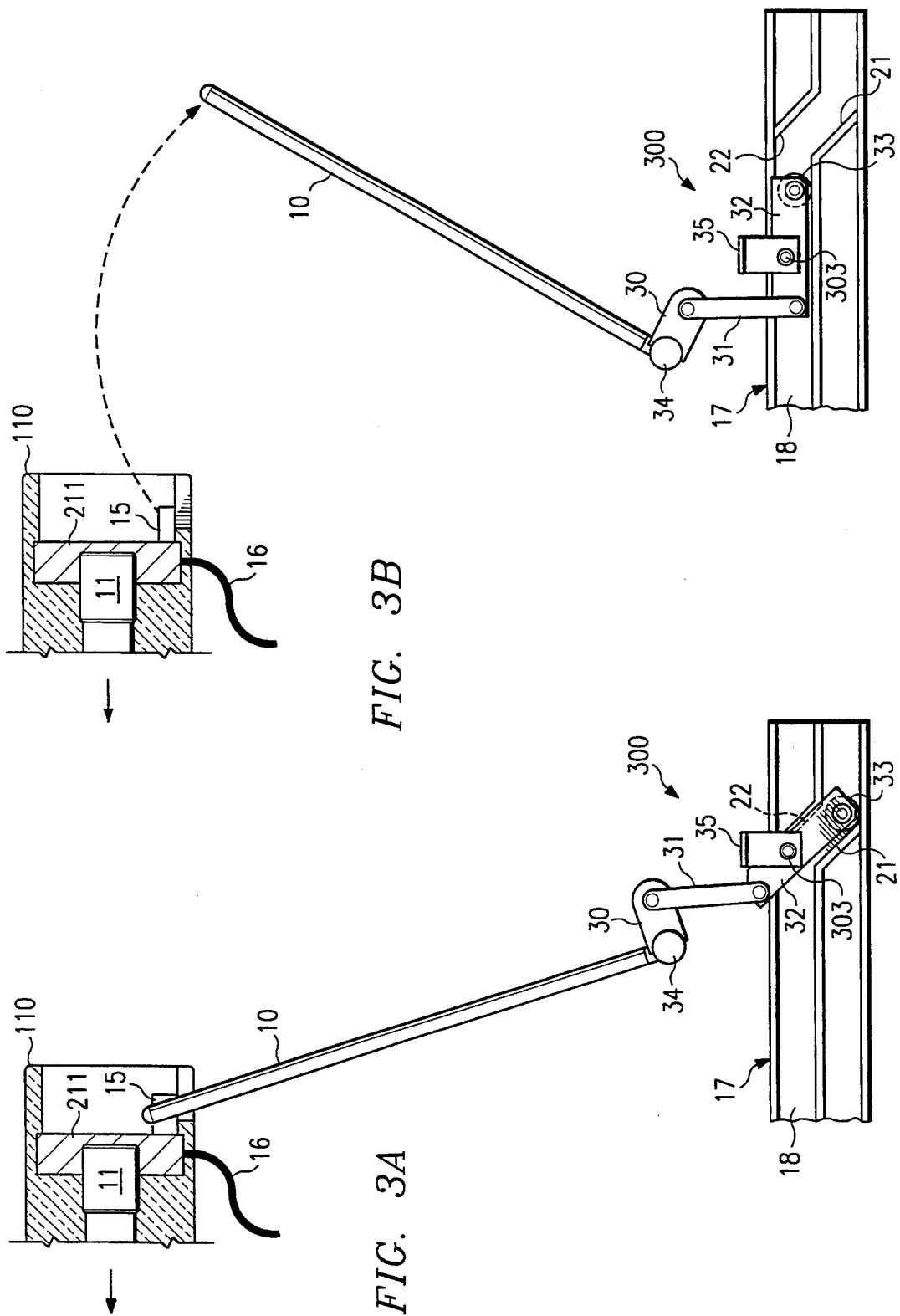

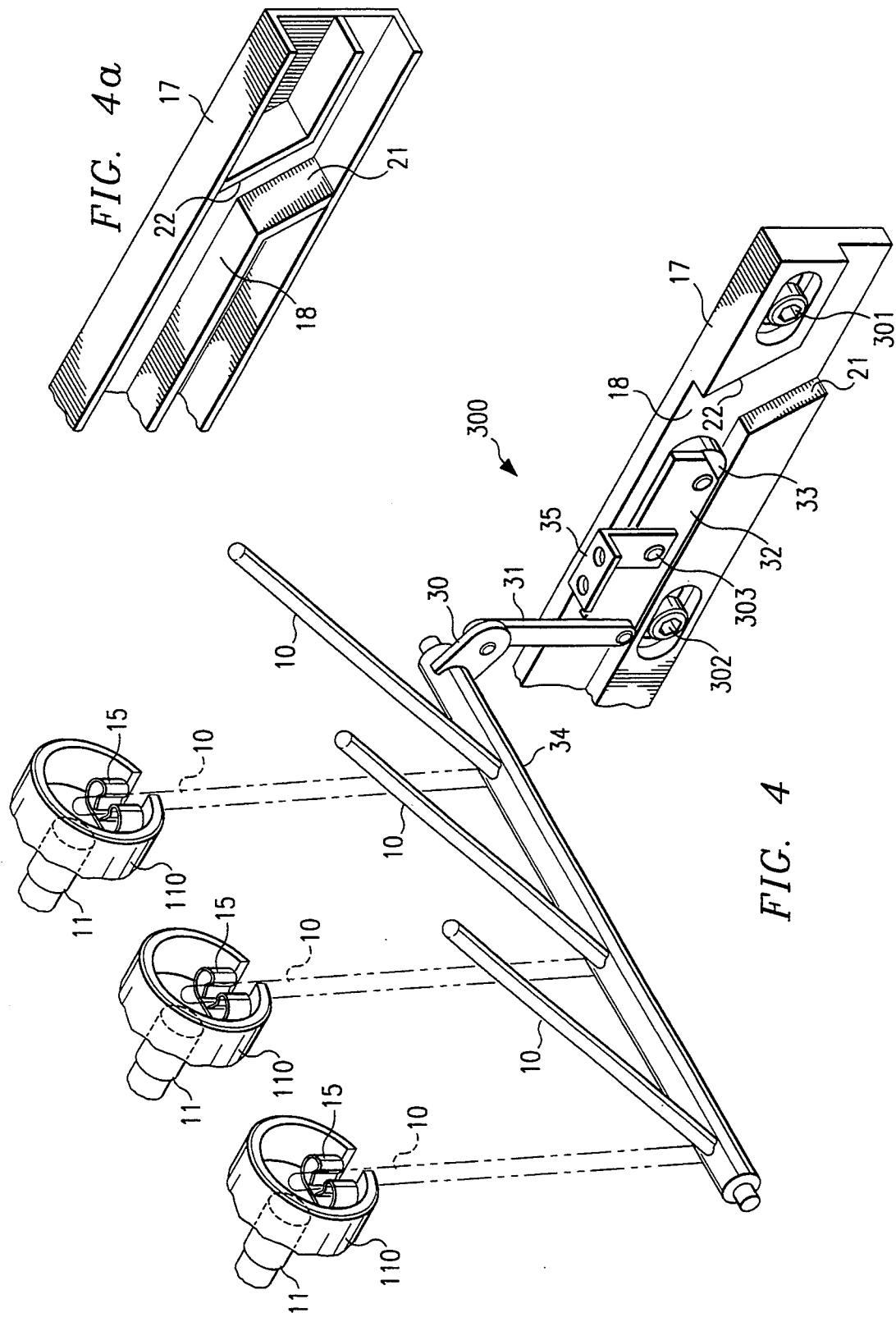

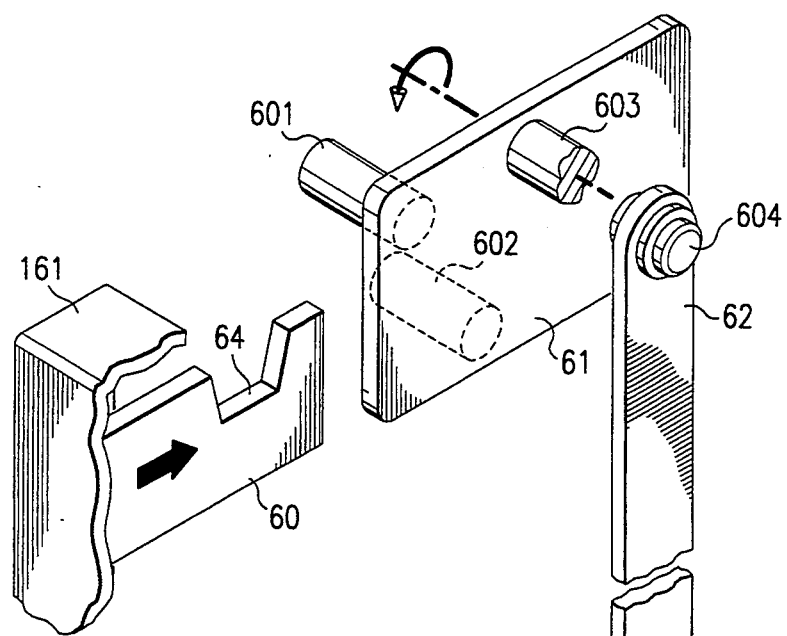
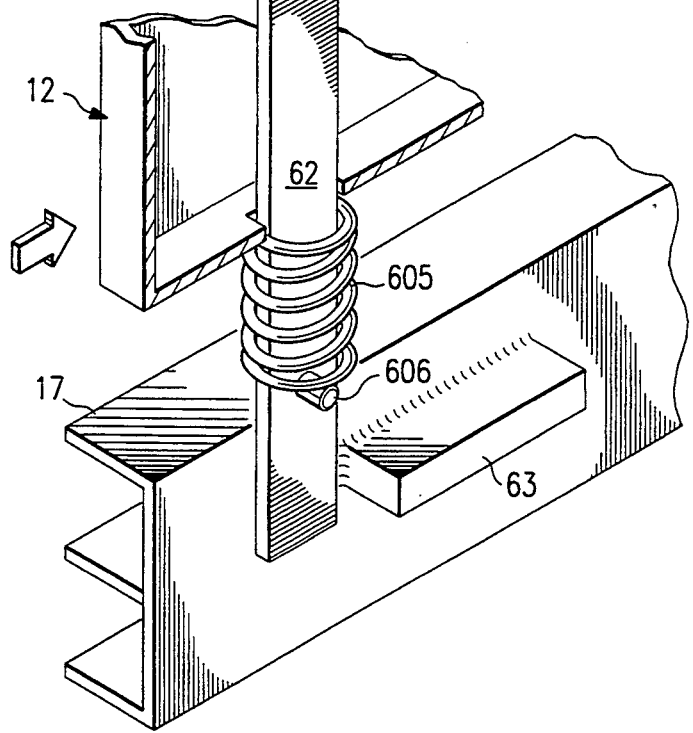
FIG. 6

VOLTAGE TRANSFORMER DISCONNECT GROUNDING SYSTEM

TECHNICAL FIELD OF THE INVENTION

This invention relates to voltage transformer disconnect systems and more particularly to a grounding system to insure discharge of such transformers or associated fuse carriage when removed from the energized line.

BACKGROUND OF THE INVENTION

High voltage transformers, such as are used for transforming voltages such as 38 kV to 110 volts for use in medium voltage switchgear metering and relaying applications, must be grounded when they are removed from the power source because such devices are capable of storing a substantial charge on the transformer winding. This charge can injure a repair person who inadvertently touches a disconnected transformer terminal if the charge has not been removed from the transformer. Thus, it has become a requirement that voltage transformers be grounded as they are removed from the power source. Typically, this grounding is achieved by a momentary brushing of grounding contacts mounted on the device drawer such that when the drawer is opened, or the device is pulled out, the grounding contacts make momentary contact with the system ground, thereby discharging the transformer.

Several problems can occur using such a method. One major obvious problem is the simple fact that the contacts may not touch because of misalignment or because they are broken. Thus, a technician who makes the erroneous assumption that the contacts have discharged the transformer is placed in jeopardy of serious, if not fatal, injury.

An additional problem with existing systems is that the grounding contacts momentarily mate only after the drawer or drawout element has been almost fully removed from the cabinet. Thus, if the drawer has not been fully opened, or the drawout not fully removed, the transformer remains charged and a technician could reach in and touch the energized transformer or associated equipment.

Another problem with existing grounding systems is that typically the actual circuit ground to the power source is broken soon after the transformer is momentarily grounded and therefore the entire cabinet becomes electrically isolated. This could present problems if, for example, a flashover occurs from the power source to the pull-out drawer or drawout element, again resulting in potential injury to an operator.

Accordingly, it is one desire to construct a transformer removal system such that an operator can visually determine that the transformers have been grounded so that if such grounding has not occurred with respect to a particular transformer, the operator can visually make such a determination.

It is a further desire to design a power system such that when a device, such as a transformer, is withdrawn from the power source, there is a permanent ground on the terminals so that the device cannot become inadvertently reconnected to a power source.

It is a still further desire to create a removable transformer system such that the main chassis ground is maintained throughout the entire travel of the drawout element/drawer or at least until the device is moved a substantial distance from the power source.

SUMMARY OF THE INVENTION

These and other objects and features have been achieved by arranging a voltage (potential) transformer drawout such that as the drawout is withdrawn from the power source a permanent contact is established between the input of the transformer and a source of ground potential. This permanent ground is maintained at all times while the drawout is disconnected. The ground is removed only when the transformer is reconnected to the power source.

The system is constructed such that the ground is established automatically by a mechanical device as the drawout is being disconnected. The ground is achieved by a series of grounded rods or bars which are physically driven against a contact that is electrically connected to the input terminal of the voltage transformer. The design is such that when the drawout is being inserted and the voltage transformer reconnected to the power source, the ground rods are mechanically removed from the terminal prior to full insertion. The removed ground rods are positioned such that they cannot inadvertently (due to a mechanical failure) reestablish ground except under mechanical movement as the drawout is again removed from the switch gear housing or framework.

Accordingly, one technical advantage of this design is that a visual semi-permanent ground is established that an operator can observe to ensure that the transformer, or other device, is discharged.

A further technical advantage is that such a system establishes a permanent ground on the removed device which is in line with utility company safety practices.

A still further advantage of this grounding system is that the system is configured so that active devices cannot be accessed unless they are in a grounded position, thereby eliminating the possibility that a drawout could be moved to a certain position which exposes live ungrounded parts.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B, respectively, show expanded (and reversed from FIG. 1) views of the grounding bar in the connected and disconnected status;

FIG. 4 shows a three phase grounding system in the disconnected position;

FIG. 4A, shows a preferred embodiment of the ramp assembly made from sheet metal;

FIG. 6 shows details of the door closing and rollout release assembly.

DETAILED DESCRIPTION OF THE INVENTION

Figure 5A:
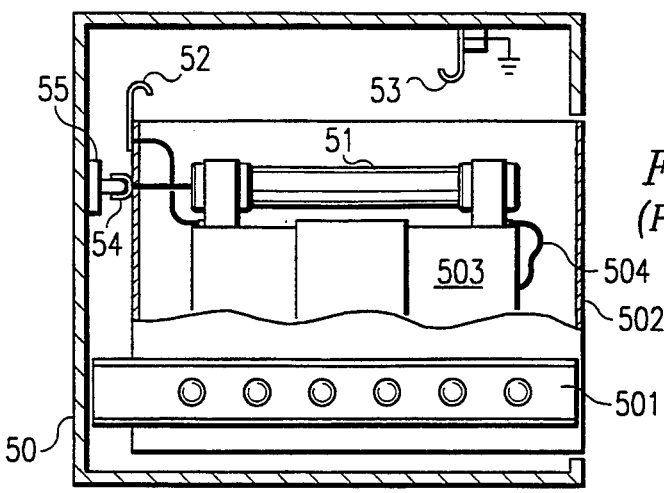
FIGS. 5A, 5B AND 5C show a prior art grounding system in the fully closed, partially open and fully open, respectively, positions.
Figure 5B:
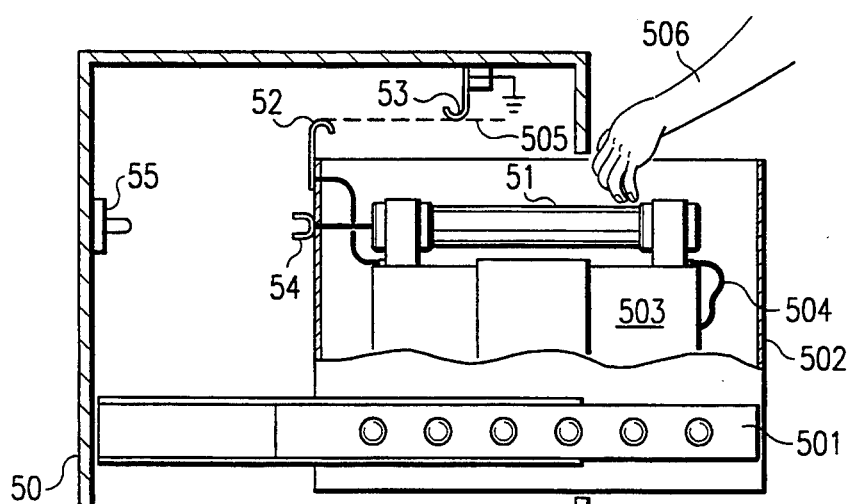
Figure 5C:
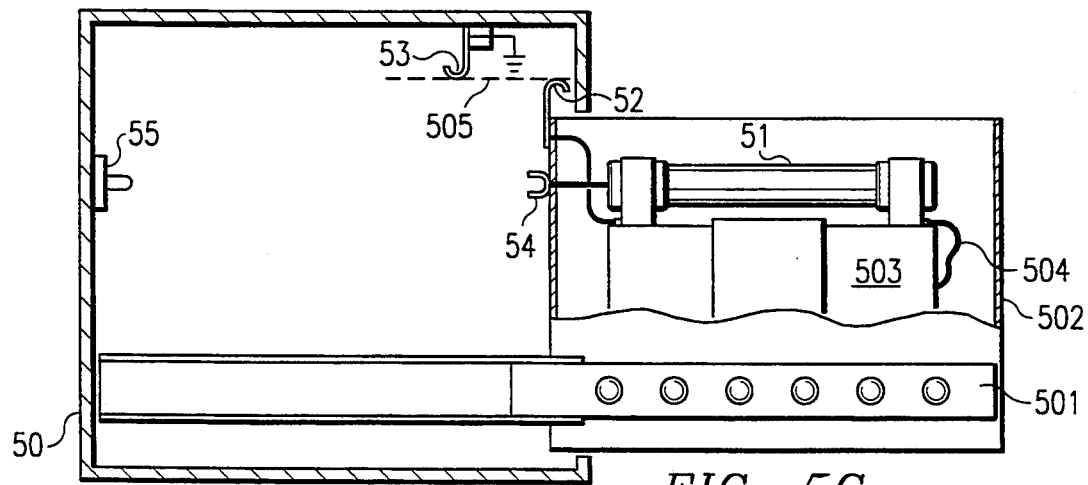

Before beginning a discussion of the operation of the inventive system, perhaps it would be worthwhile to review the prior art systems with respect to FIG. 5A, FIG. 5B and FIG. 5C.

FIG. 5A of the prior art shows a housing 50 with removable drawer 502. Within housing 50 is transformer 503 and sitting on top of transformer 503 is fuse 51. The load side of the fuse 51 is connected via cable 504 to a transformer 503. The lines out of the fuse are connected via terminal 54 to input bus 55. Contact 52 is connected to the input side of fuse 51.

In FIG. 5B, drawer 502 is shown partially pulled out of the housing along along guiderail 501. Drawer 502 has been pulled out far enough so that terminal 54 has separated from input bus 55 so that power has been removed from the line side of fuse 51. However, as previously discussed, device 503 may be a transformer having capacitive characteristics such that a charge will remain on the terminal, particularly on the input terminal which is extended to contact 52. Thus, as shown in FIG. 5B, as transformer drawer 502 is being extended, the top of the drawer is open in the prior art, thereby allowing an operator's hand such as hand 506 to be placed inside the cabinet. If this hand were to touch the contacts at this point, injury, or perhaps even death, could result to the operator. As drawer 502 continues to be extended to the open position, i.e., to the right in FIG. 5B, contact 52 moves along path 505 and makes electrical connection with contact 53. At the connection point between these two contacts, a ground circuit is made from ground through contact 53 through contact 52 to the input side of fuse 51, thereby grounding transformer 503 and removing the charge.

FIG. 5C shows drawer 502 fully extended and as can be seen, contact 52 has brushed past contact 53, thereby discharging the transformer or power device 503. At this point, assuming this prior operation of grounding, the operator is free to work inside the cabinet without fear of injury. However, if contact 53 or contact 52 has in some way become bent or misaligned so that the contacts 52 and 53 do not make electrical connection as contact 52 moves along path 505, drawer 502 could be fully extended, as shown in FIG. 5C, without discharging transformer 503. If transformer 503 has not been discharged and an operator puts his or her hand inside the unit, the operator could very well find an unpleasant and very dangerous surprise.

Another problem with the prior art arrangement shown in FIGS. 5A, 5B and 5C is that the ground is connected to the fuse on the input side. Thus, if fuse 51 were to blow out, the ground would not make contact with cable 504, and would not discharge device 503, again resulting in a potentially fatal situation.

Figure 1:
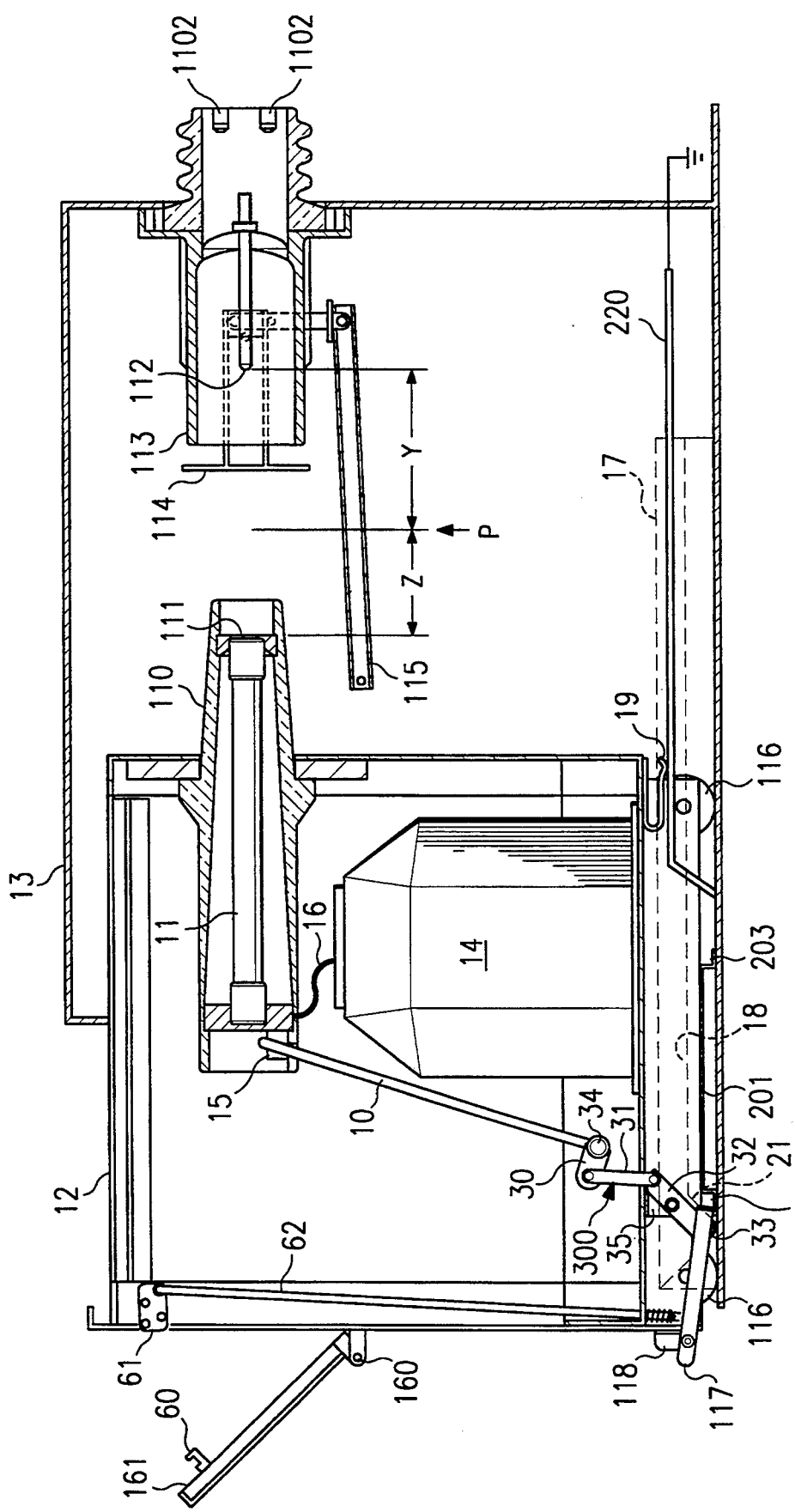
FIG. 1 shows a cut-away side perspective view of voltage transformer drawout in the disconnected (grounded) position.

Turning now to FIG. 1, switchgear components are housed in a protective switchgear frame 13 such that a transformer 14, and fuse holder 110 are mounted in a drawout 12 removably inserted into switchgear frame 13. Drawout element 12 has, in one embodiment, an access door 161 mounted to the front surface by hinge 160. FIG. 1 shows the system in the disconnect or open mode (ground switch closed).

Fuse holder 110 contains within it fuse 11. Fuse holder 110 is an insulating material surrounding the fuse 11 and primary contact 111, the line terminal of fuse 11, is mounted at the internal end of the fuse holder 110. As will be seen, when the drawout 12 is closed, primary contact 111 mates with main contact 112, which in turn is connected to contacts 1102 from the live power bus. When the drawout 12 is open, safety shutter 114 is positioned in front of housing 113 to prevent anything from inadvertently touching main contact 112.

The contact terminal 15, is positioned at the proximal end of fuse holder 110 to connect the load end of fuse 11, via wire 16, to transformer 14. Contact 15 connects transformer 14 to ground rod 10 when drawer 12 is open. In this example, transformer 14 is a 38 KV voltage transformer.

Ground rod 10 is driven by a linkage assembly 300 consisting of a driver arm linkage 30 pivoting around shaft 34, linkage 31, and truck linkage 32. Truck linkage 32, which is mounted on a pivot, has a roller 33 which travels in channel 18 when drawout 12 is in motion. Channel 18 is defined by guide rail assembly 17 which contains a ramp 21. The details of guide rail assembly 17 and how it controls the pivoting of linkage assembly 300 will be detailed hereinafter. Wheels 116 of drawout 12 allow for the easy movement of drawout 12. As will be detailed, bracket 35 holds the pin on which truck linkage 32 pivots.

The connections to the live power bus consist of the main contact 112 surrounded by a housing 113 consisting of an insulation system or bushing. Safety shutter 114 protects main contact 112 when drawout 12 is removed by blocking the front of housing (bushing) 113. Safety shutter 114 can be removed from in front of housing 113 by a linkage assembly that is activated by rod 115 when it is displaced by the insertion of drawout 12.

Note that switchgear frame 13 is fixed, whereas movable drawout 12 rolls on wheels 116. Access door 161 is designed, as will be discussed hereinafter, such that it cannot be opened until drawout 12 is fully extended. The top to drawout 12 is sealed in this embodiment.

The disconnection of transformer 14 from the live power supply is illustrated in FIG. 1. The disconnection of transformer 14 is accomplished by extending drawout 12 fully to the left, as shown in FIG. 1. As drawout 12 is withdrawn from switchgear frame 13, transformer 14 is disconnected from the power supply and transformer 14 is grounded by a grounding mechanism activated by the movement of drawout 12.

Figure 2:
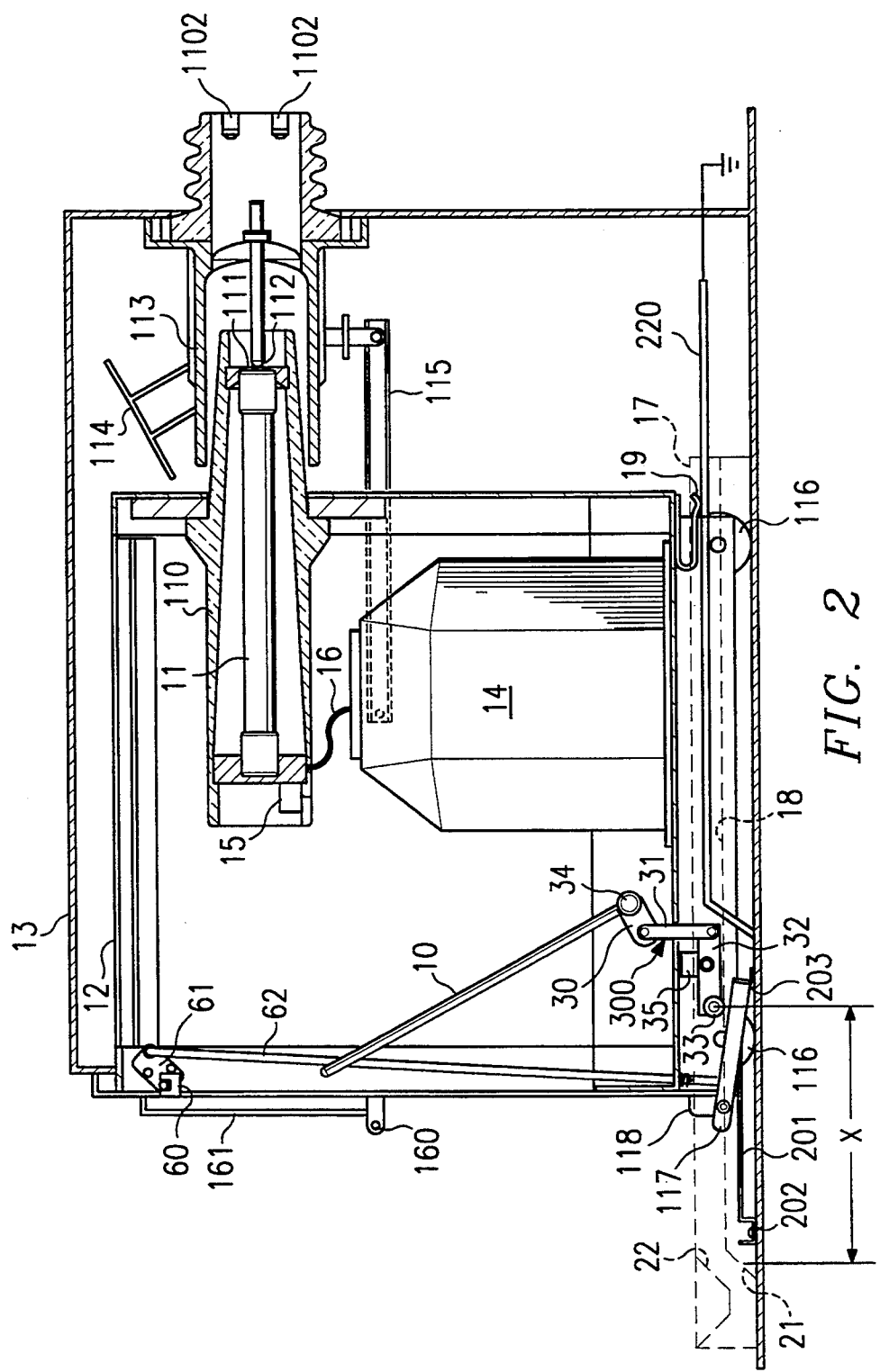
FIG. 2 shows a cut-away side perspective view of a voltage transformer drawout in the connected (ground removed) position.

Conversely, as illustrated in FIG. 2, when drawout 12 is fully inserted into switchgear frame (SGF) 13, transformer 14 is connected to the live power supply and transformer 14 is disconnected from ground. Before drawout 12 is inserted into SGF 13, or can go from the position illustrated in FIG. 1 to the position illustrated in FIG. 2, release lever 117 (an anti-rollout locking device) must be released. During the insertion of drawout 12, the grounding mechanism, which consists of ground rods 10 and associated linkages 30, 31 and 32, travels along guide rail assembly 17 until roller 33 on truck linkage 32 travels up ramp 21, thereby driving ground rod 10 into an open position with respect to contact 15. Note that the position of ramp 21 with respect to main contact 112 controls the width of gap "Y." Gap "Y" is the distance between contacts 111 and 112 when ground rod 10 is separated from contact 15 on closing (or mates with contact 15 on opening) the drawout 12. Gap "Y" represents the necessary distance that must be maintained to avoid flashover between contact 15 and the ground rods 10 when the device is in the connected or energized position.

Determination of the appropriate air gap between live conductors (Gap "Y") is made by a basic impulse level test (BIL) and other dielectric tests for the voltage class of the equipment. Distance "Y" can be adjusted as desired by the switchgear designer by altering the placement of ramp 21 with respect to main contact 112. The details of realigning ramp 21 will be discussed hereinafter.

To energize transformer 14, access door 161 must be closed (as discussed with respect to FIG. 6) and release lever 117 operated allowing drawout 12 to move to the right so that primary contact 111 of fuse 11 will mate with main contact 112 from the live power bus. As will be seen, at some point in the travel of drawout 12 and prior to the actual mating of contacts 111 and 112, ground rod 10 is released from terminal 15. Note that ground rod 10 is mounted, via linkage assembly 300, so that it travels with drawout 12 through the distance that drawout 12 travels. This is to ensure grounding whenever the drawout is disconnected and to prevent failures that can occur when two momentary contacts are designed to mate, as in the prior art.

Turning now to FIG. 2, as drawout 12 moves to the closed (connected) position, it will displace rod 115 causing shutter 114 to rotate upwards and open a path to main contact 112.

Drawout 12 can then continue forward, toward the right, until it reaches a point which is "Z" plus "Y" distance from main contact 112, as shown in FIG. 1, at which point (as shown in detail in FIG. 3B) linkage assembly 300 travels up ramp 21 forcing ground rod 10 away from contact 15. Distance "Z" represents the distance that contact 111 moves when linkage assembly 300 traverses ramp 21. Therefore by the time contact 111 has traveled through distance Z to reach gap "Y", linkage assembly 300 has traveled up ramp 21 and disconnected the transformer from ground. Ramp 21 is positioned such that ground rod 10 has moved away from terminal 15 (on closing) and begins to move toward terminal 15 (on opening) when air gap "Y" (FIG. 1) has been achieved.

Returning now to FIG. 2, after ground rod 10 has moved away from terminal 15, drawout 12 continues to the right until contact is made between primary contact 111 and main contact 112. Main contact 112 is spring loaded so that proper contact pressure is maintained.

When it is desired to disconnect transformer 14 from the power source, release lever 117 is operated to release drawout 12 which then is moved to the left, as discussed with respect to FIG. 1. Roller 33 of assembly 300 moves along channel 18 toward the left a distance "X" (which equals distance "Y" shown in FIG. 1). Ground rod 10 remains in the open position until roller 33 goes down ramp 21, thereby allowing any arc on the primary contacts to extinguish before shorting out terminal 15. Once the drawout has cleared the desired "Y" gap distance, roller 33 goes down ramp 21 forcing ground rod 10 to short out terminal 15. Note that ground rod 10 is permanently connected to a source of ground. Note also that incidental grounding paths exist throughout the chassis.

Release lever 117 will lock the drawout 12 in the fully disconnected position and it must be lifted over detention 202 before drawout 12 can be started back in.

Release lever 117 will latch in the appropriate position behind detention 203 to prevent further movement of drawout 12 whenever full contact pressure is achieved. This is accomplished when transformer 14 is connected to the power supply and a tab on release lever 117 falls into a detention 203 in runner 201 (not fully shown but similar to detention 202 shown in FIG. 2). Similarly, release lever 117 will stabilize drawout 12 in the disconnected position when the tab falls into detention 202 in runner 201. Release lever 117 may be pad locked by using hasp 118 (not fully shown).

Note that when, as shown in FIG. 2, the switchgear is in the live position (connected mode) ground bar 10 is leaning (over-center) toward the left. The system is designed such that in the event of a breakage of any part of the linkage assembly 300, the ground rod 10 will maintain itself in an open position thereby avoiding any inadvertent grounding to a live bus. In addition, whenever drawout 12 is pulled back from the connected position to the disconnected position and a linkage has been broken with respect to the transformer 14, an operator can visually determine that the transformer 14 has not been discharged and is unsafe to touch.

The operation of access door 161 (shown in FIGS. 1 and 2) will now be discussed with reference to FIG. 6 which shows interlock rod 62 in the drawout open (disconnect) position. Rod 62 has been pulled beyond the end of blocking strip 63 which is welded to switchgear frame 13. Interlock rod 62 is forced downward by spring 605 working against pin 606. This downward motion pulls driver rod 604 down forcing latch assembly 61 to pivot around pin 603 causing pin 601 to move upward out of indent 64 of latch 60, thus allowing access door 161 to open. Note that for ease of drawing this assembly, the assembly is shown on the far side. In actual practice, blocking strip 63 would be on the near side and welded to guiderail assembly 17. In this position access door 161 is free to pivot on hinge 160 and open (FIG. 1).

In order to push drawout 12 into the closed position, access door 161 must first be closed. Latch 60, on door 161, when closing strikes pin 602 rotating latch assembly 61 counterclockwise around pivot pin 603. This motion rotates pin 601 into indent 64 and lifts interlock rod 62 by rotating pin 604 around pin 603. Once lifted, rod 62 will clear the end of blocking strip 63 allowing movement of the drawout to the right, or closed position.

Interlock rod 62 will rest on top of blocking strip 63 during the closing movement of drawout 12 thereby forcing engagement between pin 601 and indent 64 of latch 60 causing access door 161 to remain closed.

When removing drawout 12, interlock rod 62 will remain on top of blocking strip 63 until the rollout reaches its disconnected position. At the disconnected position, as discussed above, the blocking strip ends and spring 605 will push the interlock 62 downward allowing door 161 to open.

When interlock rod 62 is in its down (open) position, it will strike the end of blocking strip 63, thus preventing insertion of drawout 12 until access door 61 is closed, thereby lifting the interlock rod 62 to clear the blocking strip 63.

In the event that access door 161 is left open prior to closing drawout 12, the interlock bar will not allow drawout 12 to be pushed in the direction of the live power bus.

Turning to FIGS. 3A and 3B, illustrating a portion of guide rail assembly 17 from the inside, linkage assembly 300 which controls the position of ground rod 10 is shown positioned at the bottom (FIG. 3A) and at the top (FIG. 3B) of ramp 21. In actual practice, as shown in FIG. 4, ground rod 10 represents three ground rods, one for each phase of a three-phase switchgear. The ground rods are connected to a common shaft 34 that makes them operate simultaneously. Shaft 34 is connected to driver arm linkage 30 which operates all three ground rods at the same time. Driver arm linkage 30 is driven by linkage 31 which is, in turn, connected to truck linkage 32. Roller 33 is mounted on truck linkage 32 on the opposite side of the center pivot 303 from linkage 31 such that when roller 33 moves downward (such as down ramp 21) truck linkage 32 rotates into a more vertical position. Likewise, when roller 33 moves up ramp 21, truck linkage 32 moves into a more horizontal position. In FIG. 3A, roller 33 is down ramp 21, which is the drawout open (disconnect) mode. In this position, linkage 31 pushes up on the proximal end of driver arm linkage 30, causing the distal end of driver arm 30 to apply torque to shaft 34. Shaft 34 then rotates counterclockwise, causing ground rod 10 to engage contact terminal 15 connected to the input contact 211 of transformer 14.

As the drawout 12 is inserted into switchgear frame 13 to reach the connected position, as shown in FIG. 3B, roller 33 rides along the lower portion of guide rail assembly 17 and up ramp 21. Ramp 21 forces roller 33 upward which pivots truck linkage 32 to a more horizontal position and pulls linkage 31 down, thereby rotating driver arm linkage 30 and shaft 34 in a clockwise direction which, in turn, forces ground rod 10 from terminal 15. This removes the ground connection from the fuse assembly and enables the fuse 11 to be subsequently connected to the live power bus.

On removing drawout 12 from the connected position to the disconnected position, roller 33 travels along channel 18 of guiderail assembly 17, and contacts surface 22, which forces roller 33 down ramp 21 and pushes linkage 31 upward into driver arm linkage 30. Driver arm linkage 30 applies counterclockwise torque to shaft 34, thereby driving ground rod 10 into terminal 15 (FIG. 3A) and grounding fuse 11 and voltage transformer 14 through wire 16.

In operation, ramp 21 is positioned such that ground rod 10 makes contact with fuse 11 prior to the time when access door 161 (FIG. 1) can be opened by the operator. During this operation, ground is established on ground rod 10 through a wired connection directly from the ground rod to ground contact 19 (FIG. 1) which travels along ground bus 220 in the bottom of the switchgear frame 13, or the switchgear housing. This contact between moving ground contact 19 attached to drawout 12 and stationary ground bus 220 attached to the switchgear frame 13 is maintained until the disconnected position is reached and then exceeded. To completely disconnect this ground contact, the operator must remove drawout 12 from the switchgear frame 13.

FIG. 4 shows a portion of three fuses 11, each representing a separate phase of a multi-phase system, as discussed above. Each terminal 15 is grounded by a ground rod. The three ground rods are connected by common shaft 34 which is connected to linkage assembly 300, which, as discussed, causes ground rods 10 to rotate open as shown so that fuses 11 may be connected to a live power source. Upon disconnect from a power source and the removal of the drawout 12, linkage assembly 300 moves to the right, causing wheel 33 to slide down ramp 21, thereby rotating (as discussed previously) ground bars 10 to bear against contact 15 of each of the phases.

In the preferred embodiment, guide rail assembly 17 is welded to the frame. However, one could design the system to be adjusted so that guide rail assembly 17 can be laterally adjusted via bolts 301 and 302 in their respective slots so as to be able to adjust ramp 21 with respect to its distance from the power source, thereby effectively modifying gap "Y" shown in FIG. 1.

FIG. 4A shows the same assembly as shown in FIG. 4, except that the preferred embodiment is shown as sheet metal.

It should be noted that while this embodiment discusses a switchgear device having a drawout, this, of course, can be any similar device mounted as a drawer, tilt-out, or removable element having one or more devices such as transformers or interrupting (fuses) devices therein. Also note that while the ground rods 10 have been shown as straight rods, there can be any number of arrangements which will make permanent and visual contact with ground while the drawer is in the open (disconnected) mode. Furthermore, while ground connection 19 has been shown as a moving contact, this contact can be eliminated and a permanent wire affixed for added security if necessary.

Although the present invention and its advantages have been described in detail, it should be understood that various changes, substitutions and alterations can be made herein without departing from the spirit and scope of the invention as defined by the appended claims.

What is claimed is:

1. A drawout, associated with an electric power system, comprising:
    a power device having a power connection to connect to and disconnect from a source of power;
    means, including an input terminal to said power device, for receiving power from said power source when said drawout is in a connected position; and
    a grounding device, controlled by movement of said drawout between said connected position and a disconnected position, for connecting a ground connection to said input terminal, wherein said grounding device comprises a linkage assembly, actuated by a ramp permanently affixed to a protective frame of said drawout, for rotating said ground connection into contact with said input terminal.

2. A drawout according to claim 1 wherein said linkage assembly is affixed to said drawout.

3. A drawout according to claim 1 wherein said protective frame further comprises:
    a channel permanently affixed to said protective frame, wherein said channel contains said ramp and said channel comprises a first portion disposed proximate a first end of said ramp and a second portion disposed proximate a second end of said ramp.

4. A drawout according to claim 3 further comprising:

a truck and roller assembly for traveling within said channel, said truck and roller assembly coupled to said linkage assembly and operable for rotating said ground connection into contact with said input terminal when said truck and roller assembly is positioned in said first portion of said channel and for rotating said ground connection away from said input terminal when said truck and roller assembly is positioned in said second portion of said channel.

5. A drawout according to claim 1 wherein said power device includes a plurality of such power devices, each said power device having a separate input terminal and wherein said grounding device includes means for individually connecting each one of a plurality of ground connections to a select one of said separate input terminals.

6. A drawout according to claim 5 wherein said plurality of ground connections are controlled by a common shaft.

7. A drawout according to claim 6 wherein said drawout further comprises:

a channel permanently affixed to said protective frame, wherein said channel contains said ramp and said channel comprises a first portion disposed proximate a first end of said ramp and a second portion disposed proximate a second end of said ramp;

a roller assembly for traveling within said channel, said roller assembly coupled to said linkage assembly and operable for rotating said plurality of ground connections into said separate input terminals when said roller assembly is positioned in said second portion of said channel.

8. A grounding mechanism for an electrical device, comprising:

one or more ground rods for contacting one or more electrical terminals;

a guiderail assembly, said assembly further comprising a channel having an upper and a lower level, said upper and lower levels connected by a ramp;

a linkage assembly connecting a roller and said one or more ground rods such that said one or more ground rods are mechanically rotated with respect to said one or more electrical terminals when said roller traverses said ramp.

9. A grounding mechanism in accordance with claim 8, wherein said one or more ground rods are rotated to contact said one or more electrical terminals when said roller traverses said ramp downward, such that said roller is positioned at said lower level of said channel and wherein said one or more ground rods are rotated away from said one or more electrical terminals when said roller traverses said ramp upward, such that said roller is positioned at said upper level of said channel.

10. A grounding mechanism in accordance with claim 8 wherein said one or more ground rods are simultaneously rotated when said roller traverses said ramp.

* * * * *